United States Patent
Hagiwara et al.

[11] Patent Number: 5,804,253
[45] Date of Patent: *Sep. 8, 1998

[54] METHOD FOR ADHERING OR SEALING

[75] Inventors: Kazuo Hagiwara, Kobe; Kouji Noda, Yokohama, both of Japan

[73] Assignee: Kanegafuchi Chemical Ind. Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 679,670

[22] Filed: Jul. 12, 1996

[30] Foreign Application Priority Data

Jul. 17, 1995 [JP] Japan .................................. 7-180140

[51] Int. Cl.$^6$ ...................................................... B05D 7/14
[52] U.S. Cl. ...................... 427/386; 427/387; 427/388.2; 156/71; 156/182
[58] Field of Search .............................. 427/388.1, 388.2, 427/386, 388.4, 388.5, 387; 156/71, 182

[56] References Cited

U.S. PATENT DOCUMENTS

| | | |
|---|---|---|
| 3,423,376 | 1/1969 | Gobran et al. . |
| 3,644,315 | 2/1972 | Gardner et al. . |
| 4,463,129 | 7/1984 | Shinada et al. ............................. 525/63 |
| 4,900,772 | 2/1990 | Imanaka et al. ......................... 524/303 |
| 4,904,732 | 2/1990 | Iwahara et al. ......................... 525/100 |
| 5,120,379 | 6/1992 | Noda et al. .............................. 156/107 |

FOREIGN PATENT DOCUMENTS

| | | |
|---|---|---|
| 252372 | 1/1980 | European Pat. Off. . |
| 287025 | 10/1988 | European Pat. Off. . |
| 312967 | 4/1989 | European Pat. Off. . |
| 320259 | 6/1989 | European Pat. Off. . |
| 1022904 | 1/1989 | Japan . |
| 1038407 | 2/1989 | Japan . |

OTHER PUBLICATIONS

Translation of JP01–022904, Jan. 1989, Noda et al.
Translation of JP01–038407, Feb. 1989, Iwahara et al.

*Primary Examiner*—Erma Cameron
*Attorney, Agent, or Firm*—Varndell Legal Group

[57] ABSTRACT

A method for producing an adhered or sealed anodized aluminum product or a glass product surface-treated by metal or a metal compound, by using as adhesive or sealant a curable composition, in an adhering treatment or sealing treatment of an adhesion substrate composed of anodized aluminum or glass surface-treated by metal or a metal compound, wherein the curable composition comprising (A) a saturated hydrocarbon polymer having at least one silicon-containing group crosslinkable by forming a siloxane bond and having a hydroxyl group or a hydrolyzable group bonded to the silicon atom, and (B) a silane coupling agent selected from a group comprising an epoxy group-containing silane coupling agent and an isocyanate group-containing silane coupling agent.

5 Claims, No Drawings

METHOD FOR ADHERING OR SEALING

BACKGROUND OF THE INVENTION

1. Field of the Invention

The present invention relates to an adhering and sealing method of aluminum and glass by curable composition comprising a saturated hydrocarbon polymer having at least one silicon-containing group (hereinafter, referred to as reactive silicon group) crosslinkable by forming a siloxane bond and having hydroxyl group or hydrolyzable group bonded to the silicon atom, and an adhesiveness imparting agent.

2. Description of the Related Art

A saturated hydrocarbon polymer containing a reactive silicon group is liquid polymer, and is cured by moisture or the like at ambient temperature to make a rubber-like cured material, therefore, it is used in an elastic sealant for building, and the like. This polymer, however, may have insufficient adhesiveness for various adhesion substrates since principal chain of the polymer is composed of a saturated hydrocarbon.

Especially for an anodized aluminum or a surface-treated glass such as a heat ray reflective glass used as a building material, sufficient adhesiveness can not be obtained.

SUMMARY OF THE INVENTION

The present invention solves the problems that the conventional curable composition has by providing a curable composition which is cured rapidly by moisture in air at ambient temperature, is adhered to a variety of adhesion substrate without a primer, especially to an anodized aluminum or surface-treated glass, and can give rubber-like cured material excellent in heat resistance, water resistance, heat adhesiveness resistance, water adhesiveness resistance, weather resistance and the like, and relates to a method for producing an adhered or sealed anodized aluminum product or a glass product surface-treated by metal or a metal compound in which a curable composition is used as adhesive or sealant in an adhering treatment or sealing treatment of an adhesion substrate composed of anodized aluminum or glass surface-treated by metal or a metal compound, the curable composition comprising:

(A) a saturated hydrocarbon polymer having at least one silicon-containing group crosslinkable by forming a siloxane bond and having hydroxyl group or hydrolyzable group bonded to the silicon atom, and (B) a silane coupling agent selected from a group comprising epoxy group containing silane coupling agent and isocyanate group containing silane coupling agent.

DETAILED DESCRIPTION OF THE PREFERRED EMBODIMENTS

The method of the present invention uses, as (A) component, a saturated hydrocarbon polymer (hereinafter, sometimes referred to as a saturated hydrocarbon polymer (A)) having at least one silicon-containing group crosslinkable by forming a siloxane bond and having hydroxyl group or hydrolyzable group bonded to the silicon atom, namely reactive silicon group.

As a representative example of this reactive silicon group, a group is listed represented by the general formula (1):

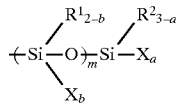

In the general formula (1), $R^1$ and $R^2$ each is alkyl group having 1–20 carbon atoms, aryl group having 6–20 carbon atoms, aralkyl group having 7–20 carbon atoms or triorganosiloxy group represented by $R'_3SiO-$, wherein $R'$ is monovalent alkyl group having 1–20 carbon atoms and three $R'$s may be the same or different; each of $R^1$s and $R^2$s may be the same or different when more than one $R^1$s and $R^2$s exist respectively; X is hydroxyl group or hydrolyzable group, and may be the same or different when more than one Xs exist; a is 0, 1, 2 or 3; and b is 0, 1 or 2, wherein a+mb>1, each b in

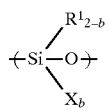

need not be the same, and m is 0 or an integer from 1–19.

The hydrolyzable group in the general formula (1) is not specifically restricted and may be known hydrolyzable group, as an example, a hydrogen atom, alkoxy group, acyloxy group, ketoximate group, amino group, amido group, aminooxy group, mercapto group, alkenyloxy group or the like, may be listed. Among them, alkoxy group is especially preferable in that hydrolyzability is calm and it is easy to handle.

This hydrolyzable group and hydroxy group respectively may be bonded to one silicon atom in a number of 1–3, and (a+mb) is preferably in the range of 1–5. When hydrolyzable group and hydroxy group exist in the reactive silicon group respectively more than 1, they may be the same or different.

The number of the silicon atom contained in this reactive silicon group may be 1 or more than 1, if the silicon atom is linked by a siloxane bond, a number of up to 20 is preferred. Especially, the reactive silicon group represented by the formula below is preferable since it is easily available:

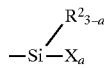

wherein $R^2$, X and a are as defined above.

At least one, preferably 1.1–5 reactive silicon groups exist in one molecule of the saturated hydrocarbon polymer. The number of reactive silicon groups in the molecule is less than 1, curability is insufficient, and excellent rubber elastic behavior is difficult to be manifested. The reactive silicon group may exist at the end, in the intermediate portion or both of the saturated hydrocarbon polymer molecule chain. Especially it is preferable that the reactive silicon atom exists at the end of the molecule, in that a rubber-like cured material having high strength and high elongation is easy to be obtained, since effective network content of the saturated hydrocarbon polymer component included in a finally formed cured material increases. Further, the saturated hydrocarbon polymer having the reactive silicon atom may be used alone, or used in combination of more than 1.

"saturated hydrocarbon polymer" used herein means a polymer substantially containing no carbon to carbon unsaturated bond other than an aromatic ring, and a polymer which is a skeleton of the saturated hydrocarbon polymer having the reactive silicon group used in the present invention can be obtained according to the following method.

(1) a method in which an olefin compound having 1–6 carbon atoms such as ethylene, propylene, 1-butene, isobutylene or the like is polymerized as a main monomer.

(2) a method in which a diene compound such as butadiene, isoprene or the like is homopolymerized, or after copolymerization of the above-mentioned olefin compound and the diene compound, hydrogenation is conducted.

Among these polymers, an isobutylene polymer and a hydrogenated polybutadiene polymer are preferable in that a functional group is easy to be introduced in the end, molecular weight is easy to be regulated, the number of terminal functional groups can be increased.

This isobutylene polymer may be that which every monomer unit is an isobutylene unit, or that which contains a monomer unit copolymerizable with isobutylene preferably in an amount of equal to or less than 50% (% by weight, hereinafter the same), more preferably equal to or less than 30%, specifically preferably equal to or less than 10% based on the isobutylene polymer.

As such monomer component, for example, olefin having 4–12 carbon atoms, vinyl ether, aromatic vinyl compound, vinyl silanes, allyl silanes or the like may be listed. Specific examples of the copolymer component include, for example, 1-butene, 2-butene, 2-methyl-1-butene, 3-methyl-1-butene, pentene, 4-methyl-1-pentene, hexene, vinylcyclohexane, methyl vinyl ether, ethyl vinyl ether, isobutyl vinyl ether, styrene, α-methystyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, γ-methacryloyloxypropylmethyldimethoxysilane and the like.

When vinyl silanes or allyl silanes is used as a monomer copolymerized with such isobutylene, silicon content of the polymer is increased, and groups which can act as a silane coupling agent increase, adhesiveness of the resulting composition is improved.

Further, also in a hydrogenated polybutadiene polymer and the other saturated hydrocarbon polymer, as in the case of the isobutylene polymer, other monomer units may be included than main monomer unit.

And, in the saturated hydrocarbon polymer used in the present invention, a monomer unit which leaves double bond after polymerization like a polyene compound such as butadiene, isoprene or the like, may be included in an amount of a little, preferably 10% or less, further 5% or less, especially 1% or less, to a certain extent that the object of the present invention is attained.

Number average molecular weight of the saturated hydrocarbon polymer (A), especially isobutylene polymer and hydrogenated polybutadiene polymer, is preferably from about 500 to 100,000, specifically a polymer having a liquid to flowable feature of which molecular weight is 1,000 to 30,000 is preferred in that it is easy to handle. Further, with respect to molecular weight distribution ($M_w/M_n$) (where $M_w$ means molecular weight distribution), narrower $M_w/M_n$ is preferable in that viscosity is lower at the same molecular weight, specifically preferable $M_w/M_n$ is 1.6 or less.

The production method of the saturated hydrocarbon polymer having the reactive silicon group is explained, especially with respect to examples of an isobutylene polymer and hydrogenated polybutadiene polymer.

Among the above-mentioned isobutylene polymers having the reactive silicon group, an isobutylene polymer having a reactive silicon group at the end can be produced by using the end functional, preferably all ends functional isobutylene polymer obtained by the polymerization method called inifer method (cationic polymerization method using specific compound called inifer acting as an initiator and a chain transfer agent at the same time). Such production method is described in Japanese Patent Application Laid-Open No. 63-6003, No. 63-6041, No. 63-254149, No. 1-22904, No. 1-38407. For example, p-dicumyl chloride [Cl(CH$_3$)$_2$CC$_6$H$_4$C(CH$_3$)$_2$Cl] is use as an inifer, isobutylene is cation polymerized, in the last stage of the polymerization, 1,9-decadiene [CH$_2$=CHC$_6$H$_{12}$CH=CH$_2$] is added to polymerize to obtain a polymer having —CH$_2$CHClC$_6$H$_{12}$CH=CH$_2$ group at the end. Further, to this polymer may be reacted a hydrosilane compound having a hydrolyzable group (for example, HSi(OCH$_3$)CH$_3$) to obtain a polymer having —CH$_2$CHClC$_6$H$_{12}$CH$_2$CH$_2$Si(OCH$_3$)CH$_3$ group at the end.

The isobutylene polymer having the reactive silicon group in its molecular chain is produced by adding the vinyl silanes or allyl silanes having the reactive silicon group into a monomer mainly consisting of isobutylene for copolymerization thereof.

Further, in polymerization in production of the isobutylene polymer having the reactive silicon group in its molecular end, after copolymerization of the vinyl silanes or allyl silanes having the reactive silicon group in addition to isobutylene monomer as main component, by introducing the reactive silicon group into the end, an isobutylene polymer having the reactive silicon groups at the end and intermediate portion of the molecular chain can be produced.

Examples of the vinyl silanes or allyl silanes having the reactive silicon group include, for example, vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethylmethoxysilane, diallyldichlorosilane, diallyldimethoxysilane, γ-methacryloyloxypropyltrimethoxysilane, γ-methacryloyloxypropylmethyldimethoxysilane and the like.

As a production method for the hydrogenated polybutadiene polymer, a hydrogenated polybutadiene polymer having end olefin group (hereinafter, sometimes referred to as an end olefin hydrogenated polybutadiene polymer) is produced, for example, by firstly converting the hydroxy group of an end hydroxy hydrogenated polybutadiene polymer to oxymetal group such as —ONa, —OK or the like, and subsequently reacting an organic halogen compound represented by the general formula (3):

$$CH_2=CH—R^3—Y \qquad (3)$$

wherein, Y is a halogen atom such as a chlorine atom, an iodine atom or the like; $R^3$ is a divalent organic group represented by —$R^4$—, —$R^4$—OC(=O)—, —$R^4$—C(=O)—, wherein $R^4$ is divalent hydrocarbon group having 1–20 carbon atoms, and as preferable examples, alkylene group, cycloalkylene group, arylene group, aralkylene group may be listed, and a divalent group selected from —CH$_2$— and R"—Ph—CH$_2$— is especially preferable, wherein R" is hydrocarbon group having 1–10 carbon atoms; Ph is p-phenylene group.

As a method to convert the end hydroxy group of the end hydroxy hydrogenated polybutadiene polymer to oxymetal group, following methods may be listed: reaction with alkali metal such as Na, K; metal hydrogenated compound such as NaH; metal alkoxide such as NaOCH$_3$; caustic alkali such as NaOH, KOH.

In the above-mentioned method, an end olefin hydrogenated polybutadiene polymer having approximately the same molecular weight as the end hydroxy hydrogenated polybutadiene polymer used as a starting material is obtained. However, for higher molecular weight polymer, before reaction with the organic halogen compound of the general formula (3), the end hydroxy hydrogenated polybutadiene polymer can be reacted with a polyvalent organic halogen compound having more than 1 halogen atoms in its molecule such as methylene chloride, bis(chloromethyl) benzene, bis(chloromethyl)ether or the like, and subsequently reacted with the organic halogen compound of the general formula (3) to obtain a hydrogenated polybutadiene polymer having olefin group at the end and having higher molecular weight.

Examples of the organic halogen compound represented by the above-mentioned general formula (3) are, for example, allylchloride, allylbromide, vinyl(chloromethyl) benzene, allyl(chloromethyl)benzene, allyl(bromomethyl) benzene, allyl(chloromethyl)ether, allyl(chloromethoxy) benzene, 1-butenyl(chloromethyl)ether, 1-hexenyl (chloromethoxy)benzene, allyloxy(chloromethyl)benzene and the like, but are not restricted to them. Among them, allylchloride is preferable since it is cheap and easily react.

Introduction of the reactive silicon group into end olefin hydrogenated polybutadiene polymer, as in the case of the isobutylene polymer having the reactive silicon group at the end of the molecule, for example, is conducted using a platinum catalyst by an addition reaction of a hydrosilane compound in which a hydrogen atom is bonded to the group represented by the general formula (1), preferably a compound represented by the general formula (4):

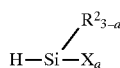 (4)

wherein, R$^2$, X and a are as defined above.

Examples of the hydrosilane compound represented by the general formula (4) are, for example, halogenated silanes such as trichlorosilane, methyldichlorosilane, dimethylchlorosilane, phenyldichlorosilane and the like; alkoxy silanes such as trimethoxysilane, triethoxysilane, methyldiethoxysilane, methydimethoxysilane, phenyldimethoxysilane and the like; acyloxysilanes such as methyldiacetoxysilane, phenyldiacetoxysilane and the like; ketoxymate silanes such as bis(dimethylketoxymate) methylsilane, bis(cyclohexylketoxymate)methylsilane and the like, but are not restricted to them. Among them, especially halogenated silanes and alkoxy silanes are preferred.

Representative example of the adhesiveness imparting agent is a silane coupling agent. However, adhesiveness imparting agents other than the silane coupling agent may be used. The silane coupling agent is a compound which has a group containing a silicon atom to which a hydrolyzable group is bonded (hereinafter, referred to as a hydrolyzable silicon group) and a functional group other than this group. As an example of this hydrolyzable silicon group, the group represented by the general formula (1) in which X is a hydrolyzable group may be listed. Specifically, groups already exemplified as the hydrolyzable group may be listed, and an alkoxy group such as a methoxy group or the like is preferred. The number of the hydrolyzable group is preferably 2 or more, specifically 3 or more.

As functional groups other than the hydrolyzable silicon group, primary, secondary, tertiary amino group, mercapto group, epoxy group, carboxy group, vinyl group, halogen, isocyanate group and the like are exemplified. Among them, vinyl group, epoxy group, isocyanate group and the like are preferable.

The hydrolyzable silicon group and the other functional groups may be bonded by means of a hydrocarbon group such as alkylene group, arylene group or the like, but there in no limitation to them. Molecular weight of the silane coupling agent is preferably 500 or less, especially 300 or less.

In the present invention, an epoxy group-containing silane coupling agent and/or an isocyanate group-containing silane coupling agent are used. Examples of such silane coupling agent are epoxy bond-containing silanes such as γ-glycidoxypropyltrimethoxysilane, γ-glycidoxypropylmethyldimethoxysilane, γ-glycidoxypropyltriethoxysilane, β-(3,4-epoxycyclohexyl) ethyltrimethoxysilane and the like; isocyanate group-containing silanes such as γ-isocyanatepropyltriethoxysilane, γ-isocyanatepropylmethyldimethoxysilane, γ-isocyanatepropyltrimethoxysilane and the like. Also, derivatives obtained by modifying them may be used as the silane coupling agent.

As epoxysilane, a compound represented by the general formula below may also be listed:

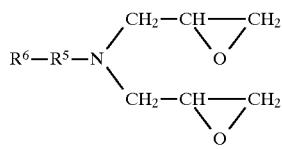

wherein, R$^5$ is a substituted or unsubstituted divalent group having 1–20 carbon atoms, R$^6$ is the following structural formula:

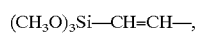

or an alkoxysilyl group.

R$^5$ in the above-mentioned formula, preferably, is alkylene group, cycloalkylene group, alkenylene group, arylene group, aralkylene group or the like.

An example of the above-mentioned compound is:

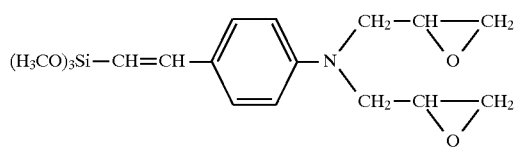

As isocyanate silane, a compound represented by the general formula below may be listed:

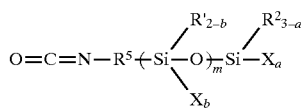

wherein, R', R², R⁵, X, a, b, m are as defined above.

As examples of such compound, above-mentioned compounds may be listed.

Further, there may be also listed reaction products of amino group substituted alkoxysilane such as
$H_2NCH_2CH_2CH_2Si(OCH_3)_3$,
$H_2NCH_2CH_2NHCH_2CH_2CH_2Si(OCH_3)_3$,
$H_2NCH_2CH_2NHCH_2CH_2CH_2Si(CH_3)(OCH_3)_2$,
$(C_2H_5O)_3SiCH_2CH_2CH_2NHCH_2CH_2NHCH_2CH_2CH_2Si(C_2H_5O)_3$
and an epoxysilane compound such as

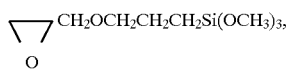

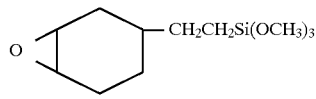

or the like.

Reaction between amino group substituted alkoxysilane and an epoxysilane compound is easily accomplished by mixing the silane compound in an amount of 0.2 to 5 moles per one mole of amino group substituted alkoxysilane and stirring the mixture for 1–8 hours at ambient temperature to 180° C.

Further, when adhesion substrate is anodized aluminum or glass surface-treated by metal or a metal compound, epoxysilane and isocyanatesilane are better than the other silane coupling agents in that their initial adhesiveness and weather resistant adhesiveness are excellent. Especially, isocyanate silane shows most excellent ability.

In the present invention, in addition to epoxy group-containing silane coupling agent or an isocyanate group-containing silane coupling agent, the other silane coupling agents may also be used. Examples of the other silane coupling agents may be amino group-containing silanes such as γ-aminopropyltrimethoxysilane, γ-aminopropyltriethoxysilane, γ-aminopropylmethyldimethoxysilane, γ-(2-aminoethyl)aminopropyltrimethoxysilane, γ-(2-aminoethyl)aminopropylmethyldimethoxysilane, γ-(2-aminoethyl)aminopropyltrimethoxysilane, γ-(2-aminoethyl)aminopropyltriethoxysilane, γ-ureidopropyltriethoxysilane, N-β-(N-vinylbenzylaminoethyl)-γ-aminopropyltrimethoxysilane, γ-anilinopropyltrimethoxysilane and the like; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane and the like; carboxy silanes such as β-carboxyethyltriethoxysilane, β-carboxyethylphenylbis(2-methoxyethoxy)silane, N-β-(N-carboxymethylaminoethyl)-γ-aminopropyltrimethoxysilane and the like; vinyl type unsaturated group-containing silanes such as vinyltrimethoxysilane, vinyltriethoxysilane, γ-methacryloyloxypropyltrimethoxysilane, γ-acryloyloxypropylmethyldimethoxysilane and the like; chlorine atom-containing silanes such as γ-chloropropylmethyltrimethoxysilane and the like. Also, derivatives obtained by modifying them may be used as the silane coupling agent. Further, amino group-containing silanes such as
$(C_2H_5O)_3SiCH_2CH_2CH_2NHCH_2CH_2NHCH_2CH_2CH_2Si(C_2H_5O)_3$ and the like, or reaction products between the above-mentioned amino group-containing silanes and methacryloxysilane compounds such as
$CH_2=C(CH_3)C(=O)-O-CH_2CH_2CH_2Si(OCH_3)_3$,
$CH_2=C(CH_3)C(=O)-O-CH_2CH_2CH_2Si(OCH_2CH_2OCH_3)_3$ and the like, may also be listed.

As the adhesiveness imparting agent other than the silane coupling agent, compounds having an epoxy group and or an isocyanate group in its molecule (including polymer of isocyanate) may be listed. As examples of such compound, compounds represented by the general formula below may be listed.

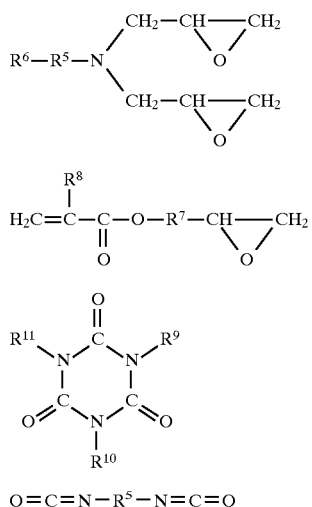

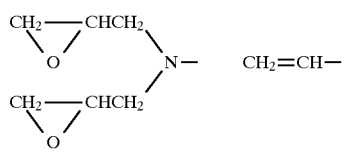

wherein, R⁵ and R⁷ are substituted or unsubstituted divalent group having 1–20 carbon atoms respectively; R⁶ is a group represented by the following structural formula or an alkoxysilyl group:

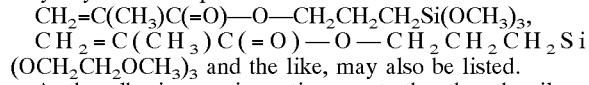

R⁸ is hydrogen or monovalent organic group having 1–10 carbon atoms, R⁹, R¹⁰ and R¹¹ are hydrogen or substituted or unsubstituted monovalent organic group having 1–20 carbon atoms respectively and they may be the same or different.

Preferable group as R⁵ in this structural formula is alkylene group, cycloalkylene group, alkenylene group, arylene group, aralkylene group or the like. Preferable group as R⁷ is alkylene group, alkyleneoxy group, cycloalkylene group, alkenylene group, alkenyleneoxy group, arylene group, aryleneoxy group, aralkylene group, aralkyleneoxy group or the like. Preferable group as R⁸ is hydrogen, alkyl group, aryl group, aralkyl group or the like. Preferable group as R⁹, R¹⁰ and R¹¹ is hydrogen, alkyl group, alkoxy group, cycloalkyl group, alkenyl group, alkenyloxy group, aryl group, aryloxy group, aralkyl group, aralkyloxy group, glycidyl group, alkyl hydroxide group or the like.

As examples of these compounds, following compounds may be listed.

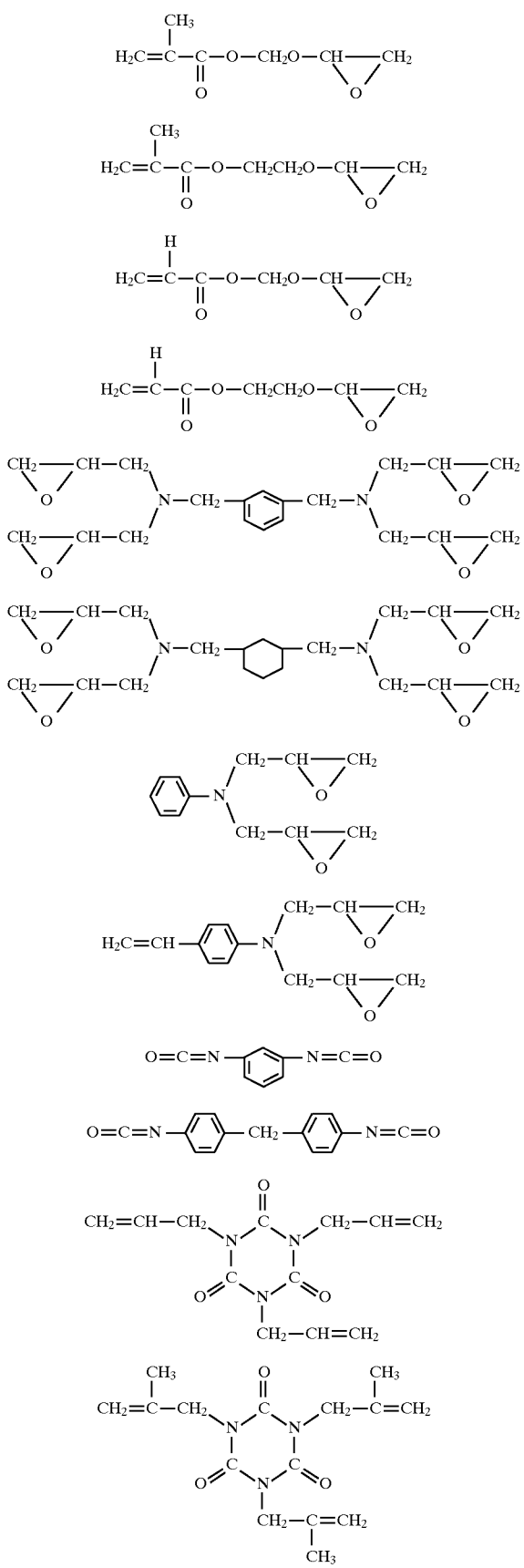

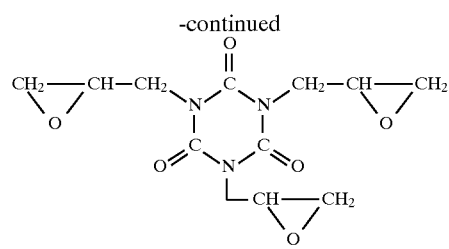

The epoxy group-containing silane coupling agent or isocyanate group-containing silane coupling agent as (B) component used in the present invention is used in an amount of 0.01–20 parts (parts by weight, hereinafter the same) based on 100 parts of the reactive silicon group-containing saturated hydrocarbon polymer. Especially, an amount of 0.1–10 parts is preferable. The above-mentioned (B) component may be used alone or used in combination of more than one.

In curing of the composition used in the present invention, a curing catalyst can be used, however may not be used. When a curing catalyst is used, known catalysts can widely be adopted. As examples thereof, there may be exemplified, for example, titanates such as tetrabutyl titanate, tetrapropyl titanate and the like; tin carboxylates such as dibutyltin dilaurate, dibutyltin maleate, dibutyltin diacetate, tin octylate, tin naphthenate and the like; a reaction product of dibutyltinoxide and phthalate; dibutyltin diacetyl acetonate; organic aluminium compounds such as aluminum trisacetyl acetonate, aluminum trisethyl acetoacetate, diisopropoxy-aluminium ethyl acetoacetate and the like; chelate compounds such as zirconium tetraacetyl acetonate, titanium tetraacetyl acetonate and the like; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, n-methyl morpholine, 2-ethyl-4-methyl imidazole, 1,8-diazabicyclo (5,4,0)undecene-7 (DBU) and the like, or salts of these amine compounds with a carboxylic acid and the like; a low molecular weight polyamide resin obtained from an excess polyamine and a polybasic acid; a silanol catalyst such as a reaction product of an excess polyamine and an epoxy compound, and the like; further, known silanol condensation catalysts such as other acidic catalyst, basic catalyst and the like; and the like. These catalysts may be used alone or used in combination of more than one.

The using amount of these curing catalysts is preferably 0.1–20 parts, more preferably 1–10 parts based on 100 parts of the reactive silicon group-containing saturated hydrocarbon polymer. When the using amount of the curing catalyst is too small for the reactive silicon group-containing saturated hydrocarbon polymer, curing speed sometimes become slow, and curing reaction sometimes become hard to fully progress. On the other hand, when the using amount of the curing catalyst is too large for the reactive silicon group-containing saturated hydrocarbon polymer, undesirably, local heat generation and foaming occur in curing, an excellent cured material is difficult to be obtained.

The reactive silicon group-containing saturated hydrocarbon polymer can be modified by mixing a variety of fillers. Examples of the fillers are, for example, reinforcing fillers such as fumed silica, precipitating silica, silicic acid anhydride, water-containing silicic acid, carbon black and the like; fillers such as calcium carbonate, magnesium carbonate, diatomite, calcined clay, clay, talc, titanium oxide, bentonite, organic bentonite, ferric oxide, zinc oxide, active zinc white, hydrogenated castor oil, silas balloon and the like; fibrous fillers such as asbestos, glass fiber, filament and the like, however, there is no limitation to them, and generally used fillers can be used.

When a high strength curable composition is required by using those fillers, a filler selected from a group mainly consisting of fumed silica, precipitating silica, silicic acid anhydride, hydrated silicate, carbon black, surface treated fine calcium carbonate, calcined clay, clay, active zinc white and the like, is used in an amount of 1–100 parts based on 100 parts of the reactive silicon group-containing saturated hydrocarbon polymer, to give a preferable result. When a low strength curable composition having high elongation is required, a filler selected from a group mainly consisting of titanium oxide, calcium carbonate, magnesium carbonate, talc, ferric oxide, zinc oxide, silas balloon and the like, is used in an amount of 5–200 parts based on 100 parts of the reactive silicon group-containing saturated hydrocarbon polymer, to give a preferable result. Needless to say, these fillers may be used alone or used in combination of more than one.

Further, in the curable composition used in the present invention, using a plasticizer together with the filler is more effective since elongation of the resulting cured material can be increased and mixing of a lot of filler is possible. Examples of such plasticizer include, for example, phthalates such as dioctylphthalate, dibutylphthalate, butylbenzylphthalate and the like; aliphatic dibasic acid esters such as dioctyl adipate, isodecyl succinate, dibutyl sebacate and the like; glycol esters such as diethylene glycol dibenzoate, pentaerythritol ester and the like; aliphatic esters such as butyl oleate, methyl acetylricinoleate and the like;. phosphates such as tricresyl phosphate, trioctyl phosphate, octyldiphenyl phosphate and the like; epoxy plasticizers such as epoxydized soybean oil, benzyl epoxystearate and the like; polyester plasticizers such as polyesters of dibasic acids and dihydric alcohols; polyethers such as polypropylene glycol, derivative thereof and the like; polystyrenes such as poly-α-methylstyrene, polystyrene and the like; plasticizers such as polybutadiene, butadiene-acrylonitrile copolymer, polychloroprene, polyisoprene, polybutene, chlorinated paraffins, petroleum softener, alkylbenzenes, trimellitic acids and the like. These plasticizers can be used alone or in combination of more than one, it is preferable to select those which have an excellent compatibility. The plasticizer is used in an amount of 0–100 parts based on 100 parts of the reactive silicon group-containing saturated hydrocarbon polymer, to give a preferable result.

The method for preparing the curable composition used in the present invention is not particularly restricted and general methods can be adopted, for example, the above-mentioned various components are blended and using a mixer, roll or kneader or the like, the blend is kneaded at ambient temperature with heating, or each component is dissolved in a small amount of a suitable solvent and the resulting solutions are mixed. Further, each component can be properly combined to give mainly a double liquid type blend.

The curable composition used in the present invention forms three dimensional network and is cured to be rubber-like elastic solid, by the action of moisture in an atmospheric air or water existing in the composition.

In using of the curable composition used in the present invention, further, a variety of additives such as an adhesiveness improving agent, physical property regulator, anti-aging agent, ultraviolet absorber, metal deactivating agent, anti ozone deterioration agent, light stabilizer, amine radical chain inhibitor, phosphorus peroxide decomposer, lubricant, pigment, foaming agent and the like, can be appropriately added as the occasion demands.

The curable composition used in the present invention is specifically useful as an elastic sealant, and can be used as a sealing agent for a building, ship, automobile, road and the like. Further, since the curable composition used in the present invention, alone or with the aid of a primer, can be closely contacted to a wide range of substrate such as glass, porcelain, wood, metal, resin mold or the like, the composition can be used also as various types of sealing compositions and adhering compositions. Further, the curable composition used in the present invention is also useful as food packing material, casting rubber material, molding material or paint, and also useful as multi layer glass material due to an excellent moisture permeation resistance.

In the present invention, as a substrate, anodized aluminum or glass surface-treated with metal or a metal compound is used. Anodized aluminum is a well known material. And, as metal or a metal compound to treat glass surface, a single metal substance such as silver, aluminum, copper, nickel, chromium, iron or the like, or a metal oxide or nitride thereof may be listed. These metals or metal compounds can be applied by a spraying method, CVD method, vacuum deposition method, sputtering method or the like.

The following Examples further illustrate the present invention in detail but are not to be construed to limit the scope thereof.

PRODUCTION EXAMPLE 1

560 ml of dried methylene chloride, 1160 ml of n-hexane, 940 mg of α-methylpyridine, 22 g of p-dicumyl chloride were weighed and charged into a four-necked flask equipped with a stirring apparatus and nitrogen line, after they were made into a homogeneous mixed solution, the solution was cooled to −70° C., and 570 ml of isobutylene monomer was charged under reduced pressure through a molecular sieves tube. After cooling to −70° C., to the above-mentioned reaction solution, a pre-cooled polymerization catalyst solution (titanium tetrachloride 14 ml/methylene chloride 80 ml) was added all at once with stirring, to start polymerization. Once the temperature was raised to −54° C., subsequently lowered to −70° C. in 17 minutes. At 20 minutes after initiation of polymerization, 132 g of 1,9-decadiene was added, and stirring was continued for further 4 hours at −70° C. The resulting yellow brown reaction solution was added to 3 liter of hot water (about 45° C.), and stirring was continued for approximately 2 hours, then an organic layer was separated, and washing with high pure water was repeated three times. Thus obtained colorless organic layer was concentrated under reduce pressure to obtain about 400 g of isobutylene oligomer having vinyl groups at both ends.

Subsequently, 400 g of thus obtained vinyl group-containing isobutylene oligomer was dissolved in 200 ml of n-heptane, and after heating to approximately 70° C., 1.5 (eq/vinyl group) of methyldimethoxysilane and $1 \times 10^{-4}$ (eq/vinyl group) of platinum (vinylsiloxane) complex catalyst were added, to conduct hydrosilylation reaction. The reaction was traced by FT-IR to find olefin absorption at 1640 $cm^{-1}$ disappeared in 4 hours.

The reaction solution was concentrated under reduced pressure to obtain an intended isobutylene oligomer having reactive silicon groups at both ends.

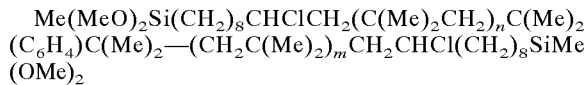

Results of various analyses of obtained isobutylene oligomer having reactive silicon groups are shown in Table 1.

In the Table 1, GPC analysis was measured by polystyrene, NMR analysis is shown in terms of aromatic proton standard derived from the initiator (p-dicumyl chloride), Fn(Si) indicates the number of silyl end group per one molecule, and viscosity indicates a value measured by E type viscometer made by Tokyo Gauge Corp.

PRODUCTION EXAMPLES 2–3

The procedure of Production Example 1 was repeated except that amounts of p-dicumyl chloride and 1,9-decadiene were reduced to half (Production Example 2), and to one-third (Production Example 3), to obtain isobutylene oligomers each having different molecular weight. Various measured values are shown in Table 1.

PRODUCTION EXAMPLE 4

The procedure of Production Example 1 was repeated except that 24 g of allylmethylsilane was used instead of 1,9-decadiene, to obtain isobutylene oligomers each having different molecular weight. Various measured values are shown in Table 1.

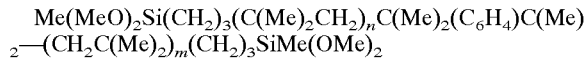

PRODUCTION EXAMPLES 5–6

The procedure of Production Example 4 was repeated except that amounts of p-dicumyl chloride and allylmethylsilane were reduced to half (Production Example 5), and to one-third (Production Example 6), to obtain isobutylene oligomers each having different molecular weight. Various measured values are shown in Table 1.

PRODUCTION EXAMPLE 7

560 ml of dried methylene chloride, 1160 ml of n-hexane, 940 mg of α-methylpyridine, 22 g of p-dicumyl chloride were weighed and charged into a four-necked flask equipped with a stirring apparatus and nitrogen line, after they were made into a homogeneous mixed solution, the solution was cooled to −70° C., and 570 ml of isobutylene monomer was charged under reduced pressure through a molecular sieves tube. To the above-mentioned reaction solution cooled to −70° C., a pre-cooled polymerization catalyst solution (titanium tetrachloride 14 ml / methylene chloride 80 ml) was added all at once with stirring, to start polymerization. Once the temperature was raised to −54° C., subsequently lowered to −70° C. in 17 minutes. Stirring was continued for about 60 minutes after initiation of polymerization. The resulting yellow brown reaction solution was added to 3 liter of hot water (about 45° C.), and stirring was continued for approximately 2 hours, then an organic layer was separated, and washing with high pure water was repeated three times. Thus obtained colorless organic layer was concentrated under reduce pressure to obtain about 400 g of isobutylene oligomer having tertiary chloro groups at both ends.

Further, thus obtained isobutylene oligomer was heated at 170° C. for 2 hours under reduced pressure to conduct thermal dehydrochloric acid reaction, to obtain an isobutylene oligomer having isopropenyl groups at both ends.

Subsequently, 400 g of thus obtained isopropenyl group-containing isobutylene oligomer was dissolved in 200 ml of n-heptane, and after heating to approximately 100° C. in a pressurized vessel, 1.5 (eq/vinyl group) of methyldichlorsilane and $1 \times 10^{-4}$ (eq/vinyl group) of platinum (vinylsiloxane) complexe catalyst were added, to conduct hydrosilylation reaction. The reaction was traced by FT-IR to find olefin absorption at 1640 $cm^{-1}$ disappeared in about 10 hours. After the reaction solution was cooled to 60° C., an excess amount of methanol was added, stirring was continued for about 4 hours, to complete methoxylation. The reaction solution was concentrated under reduced pressure to obtain an intended isobutylene oligomer having reactive silicon groups at both ends. Various measured values are shown in Table 1.

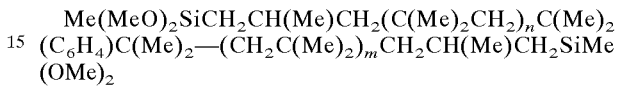

PRODUCTION EXAMPLES 8–9

The procedure of Production Example 7 was repeated except that the amount of p-dicumyl chloride was reduced to half (Production Example 8), and to one-third (Production Example 9), to obtain isobutylene oligomers each having different molecular weight. various measured values are shown in Table 1.

TABLE 1

| Production example | GPC analysis | | H-NMR analysis | | Viscosity |
|---|---|---|---|---|---|
| number | Mn | Mw/Mn | Mn | Fn (Si) | (Poise) |
| 1 | 5300 | 1.25 | 5200 | 1.85 | 4240 |
| 2 | 10400 | 1.23 | 10500 | 1.80 | 8320 |
| 3 | 16800 | 1.19 | 17100 | 1.82 | 13440 |
| 4 | 4400 | 1.15 | 4400 | 1.90 | 3520 |
| 5 | 8700 | 1.14 | 8800 | 1.88 | 6960 |
| 6 | 13600 | 1.10 | 13400 | 1.85 | 10880 |
| 7 | 4300 | 1.15 | 4200 | 1.65 | 3360 |
| 8 | 8700 | 1.14 | 8900 | 1.63 | 6960 |
| 9 | 13500 | 1.11 | 13300 | 1.73 | 10800 |

EXAMPLES 1–4, COMPARATIVE EXAMPLES 1–4

380 parts of ground $CaCO_3$ (trade name: Whiten SB), 100 parts of process oil (trade name: PS-32), 2.5 parts of carbon black (trade name: CB #30), 4 parts of dibutyltin bisacetyl acetonate (trade name: U-220) and 2 parts of mirabilite were added to 100 parts of (A) component obtained in Production Example 2, to give a mixture. And two kinds of samples were prepared, one being obtained by adding 2 parts of epoxysilane (3-glycidoxypropyltrimethoxysilane, trade name: A-187, made by Nippon unicar Corp.) as (B) component and the other being above-mentioned mixture without the (B) component. After these samples were fully kneaded respectively, they were passed through a triple paint roll three times to prepare curable compositions. Using thus obtained curable compositions, and using float glass, pure aluminum, anodized aluminum, metal-coated (titanium oxide) glass as a substrate in the form of non-primer, H type adhesiveness test samples were made according to JIS A5758. Made samples were subjected to aging of 23° C.×7 days+50° C.×7 days, and their mechanical properties were measured. The result regarding the sample to which the silane coupling agent was added (Examples 1–2, Comparative Examples 5–6), and the result regarding the sample to which no silane coupling agent was added (Comparative Examples 1 to 4) are shown in Table 2.

TABLE 2

|  | Kind of substrate | Silane coupling agent (part by weight) | 50% tensile strength (kgf/cm$^2$) | Maximum tensile strength (kfg/cm$^2$) | Elongation at maximum load (%) | Failure Mode (%) | | |
|---|---|---|---|---|---|---|---|---|
|  |  |  |  |  |  | CF | TCF | AF |
| Comparative example |  |  |  |  |  |  |  |  |
| 1 | Float glass | 0 | 3.67 | 5.24 | 65 | 80 | 10 | 10 |
| 2 | Pure aluminum | 0 | 3.75 | 4.16 | 67 | 10 | 60 | 30 |
| 3 | Anodized aluminum | 0 |  | 0.67 | 7 | 0 | 0 | 100 |
| 4 | Surface-treated glass | 0 |  | 1.66 | 19 | 0 | 0 | 100 |
| 5 | Float glass | 2 | 4.67 | 6.53 | 76 | 100 | 0 | 0 |
| 6 | Pure aluminum | 2 | 5.47 | 7.36 | 78 | 100 | 0 | 0 |
| Example |  |  |  |  |  |  |  |  |
| 1 | Anodized aluminum | 2 | 4.61 | 6.41 | 68 | 99 | 0 | 1 |
| 2 | Surface-treated glass | 2 | 5.47 | 6.14 | 60 | 95 | 0 | 5 |

CF: Cohesive failure
TCF: Thin Layer Cohesive failure
AF: Adhesive failure

As recognized by Table 2, in Comparative Examples 1 to 4 in which (B) component was not added, inclination to interfacial decomposition is predominant for various substrates, on the other hand, in Comparative Examples 5–6 and Examples 1–2 in which 2 parts of (B) component was added, cohesive failure occurred in respective substrates, which meaning better adhesiveness. Further, in the case of anodized aluminum or surface-treated glass, the degree of improvement in adhesiveness is larger as compared with the other substrates.

EXAMPLES 3–4, COMPARATIVE EXAMPLES 7–12

380 parts of ground CaCO$_3$ (trade name: Whiten SB), 100 parts of process oil (trade name: PS-32), 2.5 parts of carbon black (trade name: CB #30), 4 parts of dibutlytinbisacetyl acetonate (trade name: U-220) and 2 parts of mirabilite were added to 100 parts of (A) component obtained in Production Example 5, to give a mixture. And two kinds of samples were prepared, one being obtained by adding 5 parts of γ-isocyanate propyltriethoxy silane (trade name: Y-9030, made by Nippon unicar Corp.) as (B) component (Example 3–4, Comparative Examples 11–12) and the other being obtained by adding 5 parts of phenyltriethoxysilane (trade name: LS4480) as (B) component (Comparative Examples 7–10). After these samples were fully kneaded respectively, they were passed through a triple paint roll three times to prepare curable compositions. Using thus obtained curable compositions, and using float glass, pure aluminum, anodized aluminum, metal-coated (titanium oxide) glass as a substrate in the form of non-primer, H type adhesiveness test samples were made according to JIS A5758. Made samples were subjected to aging of 23° C.×7 days+50° C.×7 days, and their mechanical properties were measured. The result regarding the sample to which isocyanatesilane was added (Examples 3–4, Comparative Examples 11–12), and the result regarding the sample to which phenyltrialkoxysilane was added (Comparative Examples 7–10) are shown in Table 3.

TABLE 3

|  | Kind of substrate | Adhesiveness imparting agent (parts by weight) | 50% tensile strength (kgf/cm$^2$) | maximum tensile strength (kfg/cm$^2$) | Elongation at maximum load (%) | Failure Mode (%) | | |
|---|---|---|---|---|---|---|---|---|
|  |  |  |  |  |  | CF | TCF | AF |
| Comparative example |  |  |  |  |  |  |  |  |
| 7 | Float glass | Phenyl-triethoxy-silane 5 | 4.52 | 5.51 | 60 | 82 | 12 | 6 |
| 8 | Pure aluminum |  | 4.13 | 5.30 | 75 | 30 | 30 | 40 |
| 9 | Anodized aluminum |  |  | 1.80 | 18 | 0 | 0 | 100 |
| 10 | Surface-treated glass |  |  | 2.90 | 29 | 1 | 0 | 99 |
| 11 | Float glass | Isocyanate-silane 5 | 4.67 | 6.56 | 60 | 98 | 0 | 2 |
| 12 | Pure aluminum |  | 6.13 | 7.72 | 70 | 100 | 0 | 0 |

TABLE 3-continued

| | Kind of substrate | Adhesiveness imparting agent (parts by weight) | 50% tensile strength (kgf/cm$^2$) | maximum tensile strength (kfg/cm$^2$) | Elongation at maximum load (%) | Failure Mode (%) | | |
|---|---|---|---|---|---|---|---|---|
| | | | | | | CF | TCF | AF |
| Example | | | | | | | | |
| 3 | Anodized aluminum | The same | 6.56 | 7.16 | 60 | 98 | 0 | 2 |
| 4 | Surface-treated glass | as above | 6.23 | 7.65 | 85 | 100 | 0 | 0 |

As recognized by Table 3, in Examples 3–4 and Comparative Examples 11–12 in which 5 parts of (B) component was added, cohesive failure occurred in respective substrates, which meaning better adhesiveness, as compared with Comparative Examples 7–10 in which (B) component was not added. Further, in the case of anodized aluminum or surface-treated glass, the degree of improvement in adhesiveness is larger as compared with the other substrates.

EXAMPLE 5, COMPARATIVE EXAMPLE 13

300 parts of ground CaCO$_3$ (trade name: Whiten SB), 100 parts of process oil (trade name: PS-32), 5 parts of carbon black (trade name: CB #30), 3 parts of dibutyltinbisacetyl acetonate (trade name: U-220) and 2 parts of mirabilite were added to 100 parts of (A) component obtained in Production Example 1 to 9, to give a mixture. And two kinds of samples were prepared, one being obtained by adding 2 parts of isocyanatesilane (γ-isocyanatepropyltriethoxysilane, trade name: Y-9030, made by Nippon unicar Corp.) as (B) component (Example 5) and the other being above-mentioned mixture without (B) component (Comparative Example 13). After these samples were fully kneaded respectively, they were passed through a triple paint roll three times to prepare curable compositions. Using thus obtained curable compositions, and using anodized aluminum, metal-coated (titanium oxide) glass as a substrate in the form of non-primer, approximately 3 mm thick oval like sheet samples were made. Made samples were subjected to aging of 23° C.×7 days+50° C.×7 days, and an adhesiveness test was conducted by handpeel method. In Comparative Example 13, adhesive failure occurred in respective substrates, on the other hand, in example 5, cohesive failure occurred in respective substrates, which meaning better adhesiveness.

COMPARATIVE EXAMPLES 13–14

Adhesiveness tests were conducted in the same way as Example 1–2 except that

γ-methacryloxytrimethoxysilane (trade name: A-174, (CH$_3$O)$_3$Si(CH$_2$)$_3$OCOC(CH$_3$)=CH$_2$) was used as the silane coupling agent. The results are as shown in Table 4.

TABLE 4

| | Kind of substrate | 50% tensile strength (kgf/cm$^2$) | Maximum tensile strength (kgf/cm$^2$) | Elongation at maximum load (%) | Failure Mode (%) | | |
|---|---|---|---|---|---|---|---|
| | | | | | CF | TCF | AF |
| Comparative example 13 | Anodized aluminum | 4.07 | 5.64 | 92 | 98 | 0 | 2 |
| Comparative example 14 | Surface-treated glass | 3.96 | 4.79 | 69 | 10 | 0 | 90 |

When Examples 1–4 and Comparative Examples 13–14 are compared, it is understood that, in the case of surface-treated glass, isocyanatesilane and epoxysilane produce larger effect in improvement of adhesiveness.

COMPARATIVE EXAMPLES 15–16

Adhesiveness tests were conducted in the same way as Example 1–2 except that vinyltrimethoxysilane (commercial name: A-171, (CH$_3$O)$_3$SiCH=CH$_2$) was used as the silane coupling agent. The results are as shown in Table 5.

TABLE 5

|  | Kind of substrate | 50% tensile strength (kgf/cm$^2$) | Maximum tensile strength (kgf/cm$^2$) | Elongation at maximum load (%) | Failure Mode (%) | | |
|---|---|---|---|---|---|---|---|
|  |  |  |  |  | CF | TCF | AF |
| Comparative example 15 | Anodized aluminum | 4.06 | 5.27 | 118 | 100 | 0 | 0 |
| Comparative example 16 | Surface-treated glass |  | Not adhered |  |  |  |  |

When Examples 1–4 and Comparative Examples 15–16 are compared, it is understood that, in the case of surface-treated glass, isocyanatesilane and epoxysilane produce larger effect in improvement of adhesiveness.

COMPARATIVE EXAMPLES 17–20

Adhesiveness tests were conducted in the same way as Example 1–2 except that aminosilane (commercial name: A-1120, $(CH_3O)_3Si(CH_2)_3NH(CH_2)_2NH_2$) was used as the silane coupling agent. The results are as shown in Table 6.

TABLE 6

|  | Kind of substrate | 50% tensile strength (kgf/cm$^2$) | maximum tensile strength (kgf/cm$^2$) | Elongation at maximum load (%) | Failure Mode (%) | | |
|---|---|---|---|---|---|---|---|
|  |  |  |  |  | CF | TCF | AF |
| Comparative example |  |  |  |  |  |  |  |
| 17 | Float glass | 4.45 | 4.54 | 54 | 40 | 60 | 0 |
| 18 | Pure aluminum | — | 2.83 | 38 | 0 | 0 | 100 |
| 19 | Anodized aluminum |  | 2.96 | 34 | 0 | 0 | 100 |
| 20 | Surface-treated glass |  | 3.48 | 40 | 30 | 0 | 70 |

EXAMPLES 5–6, COMPARATIVE EXAMPLE 21–26

Weather resistant adhesiveness tests (after 1000 hours in sunshine weatherometer) were conducted using H type adhesiveness test sample made in Examples 2, 4 and Comparative Examples 1, 4, 5, 7, 10, 11. The results are shown in Table 7 as Examples 5–6 and Comparative Example 21–26, respectively.

TABLE 7

| Sample | | Kind of substrate | (B) component | Failure Mode (%) | | |
|---|---|---|---|---|---|---|
|  |  |  |  | CF | TCF | AF |
| Comparative example | Comparative example |  |  |  |  |  |
| 21 | 1 | Float glass | None | 30 | 50 | 10 |
| 22 | 4 | Surface-treated glass | None | 0 | 0 | 100 |
| 23 | 5 | Float glass | A 187 | 100 | 0 | 0 |
| 24 | 7 | Float glass | LS4480 | 10 | 60 | 30 |

TABLE 7-continued

| Sample | Kind of substrate | (B) component | Failure Mode (%) | | |
|---|---|---|---|---|---|
| | | | CF | TCF | AF |
| 25 | 10 | Surface-treated glass | LS4480 | 0 | 0 | 100 |
| 26 Example | 11 Example | Float glass | Y 9030 | 100 | 0 | 0 |
| 5 | 2 | Surface-treated glass | A 187 | 92 | 0 | 8 |
| 6 | 4 | Surface-treated glass | Y-9030 | 95 | 0 | 5 |

As can be understood by Table 7, in Comparative Examples 21 and 22 in which no (B) component is added, or in Comparative Examples 24 and 25 in which the adhesiveness imparting agent is phenyltriethoxysilane (LS4480) having neither epoxy group nor isocyanate group, inclination to adhesive failure increased after weather resistant adhesiveness tests. On the other hand, in Examples 5 and 6 and Comparative Examples 23 and 26 in which 2 parts of (B) component was added, cohesive failure occurred in respective substrates, the adhesiveness imparting agent having an epoxy group or isocyanate group provides an excellent weather resistant adhesiveness. Further, it is understood that, in the case of surface-treated glass, the degree of improvement in adhesiveness is larger when the adhesiveness imparting agent having an epoxy group or isocyanate group.

What is claimed is:

1. A method for adhering or sealing an anodized aluminum substrate or a glass substrate surface-treated by metal or a metal compound, which comprises applying an adhesive or sealant of a curable composition thereto, followed by curing the curable composition, wherein the curable composition comprises:
    (A) a saturated hydrocarbon polymer that has a hydroxyl group or a hydrolyzable group bonded to a silicon atom and for forming a siloxane bond and that has a ratio of weight average molecular weight ($M_w$) to number average molecular weight ($M_n$) of 1.6 or less; and
    (B) a silane coupling agent selected from a group consisting of an epoxy group-containing silane coupling agent and an isocyanate group-containing silane coupling agent.

2. A method according to claim 1, wherein the saturated hydrocarbon polymer is an isobutylene polymer or hydrogenated polybutadiene polymer.

3. A method according to claim 2, wherein the number average molecular weight of the isobutylene polymer or hydrogenated polybutadiene polymer is 500 to 100,000.

4. A method according to claim 1, wherein the silicon-containing group of the polymer (A) is a group represented by a general formula (1):

wherein $R^1$ and $R^2$ each is alkyl group having 1–20 carbon atoms, aryl group having 6–20 carbon atoms, aralkyl group having 7–20 carbon atoms or triorganosiloxy group represented by $R'_3SiO-$, wherein R' is monovalent alkyl group having 1–20 carbon atoms and the three R's may be the same or different, each of $R^1$s and $R^2$s may be the same or different when more than one $R^1$s and $R^2$s exist respectively; X is hydroxyl group or hydrolyzable group and may be the same or different when more than one Xs exist; a is 0, 1, 2 or 3; and b is 0, or 2, wherein a+mb≧1 and m is 0 or an integer from 1 to 19.

5. A method according to claim 4, wherein X in the general formula (1) is an alkoxy group.

* * * * *